United States Patent [19]

Toussaint

[11] Patent Number: 5,203,887
[45] Date of Patent: Apr. 20, 1993

[54] ADSORBENT BEDS FOR PRESSURE SWING ADSORPTION OPERATIONS

[75] Inventor: Lee J. Toussaint, Lockport, N.Y.

[73] Assignee: Praxair Technology, Inc., Danbury, Conn.

[21] Appl. No.: 804,752

[22] Filed: Dec. 11, 1991

[51] Int. Cl.$^5$ ............................................. B01D 53/04
[52] U.S. Cl. ............................................. 55/25; 55/58; 55/68; 55/75
[58] Field of Search .................. 55/25, 26, 58, 62, 68, 55/75, 179, 389

[56] References Cited

U.S. PATENT DOCUMENTS

| | | | |
|---|---|---|---|
| 2,882,244 | 4/1959 | Milton | 55/75 |
| 3,237,377 | 3/1966 | Skarstrom | 55/58 X |
| 3,280,536 | 10/1966 | Berlin | 55/58 |
| 3,313,091 | 4/1967 | Berlin | 55/58 |
| 3,923,477 | 12/1975 | Armond et al. | 55/58 X |
| 4,168,149 | 9/1979 | Armond et al. | 55/389 X |
| 4,448,592 | 5/1984 | Linde | 55/68 |
| 4,481,018 | 11/1984 | Coe et al. | 55/389 X |
| 4,552,571 | 11/1985 | Dechene | 55/389 X |
| 4,557,736 | 12/1985 | Sircar et al. | 55/389 X |
| 4,859,217 | 8/1989 | Chao | 55/68 |
| 4,925,460 | 5/1990 | Coe et al. | 55/389 X |
| 4,973,339 | 11/1990 | Bansal | 55/389 X |

*Primary Examiner*—Robert Spitzer
*Attorney, Agent, or Firm*—Alvin H. Fritschler

[57] ABSTRACT

Composite adsorbent beds comprised of conventional 13X adsorbent and special cation exchanged adsorbent materials enable vacuum pressure swing adsorption operations for air separation to be carried out at advantageously low oxygen or nitrogen product costs.

18 Claims, 1 Drawing Sheet

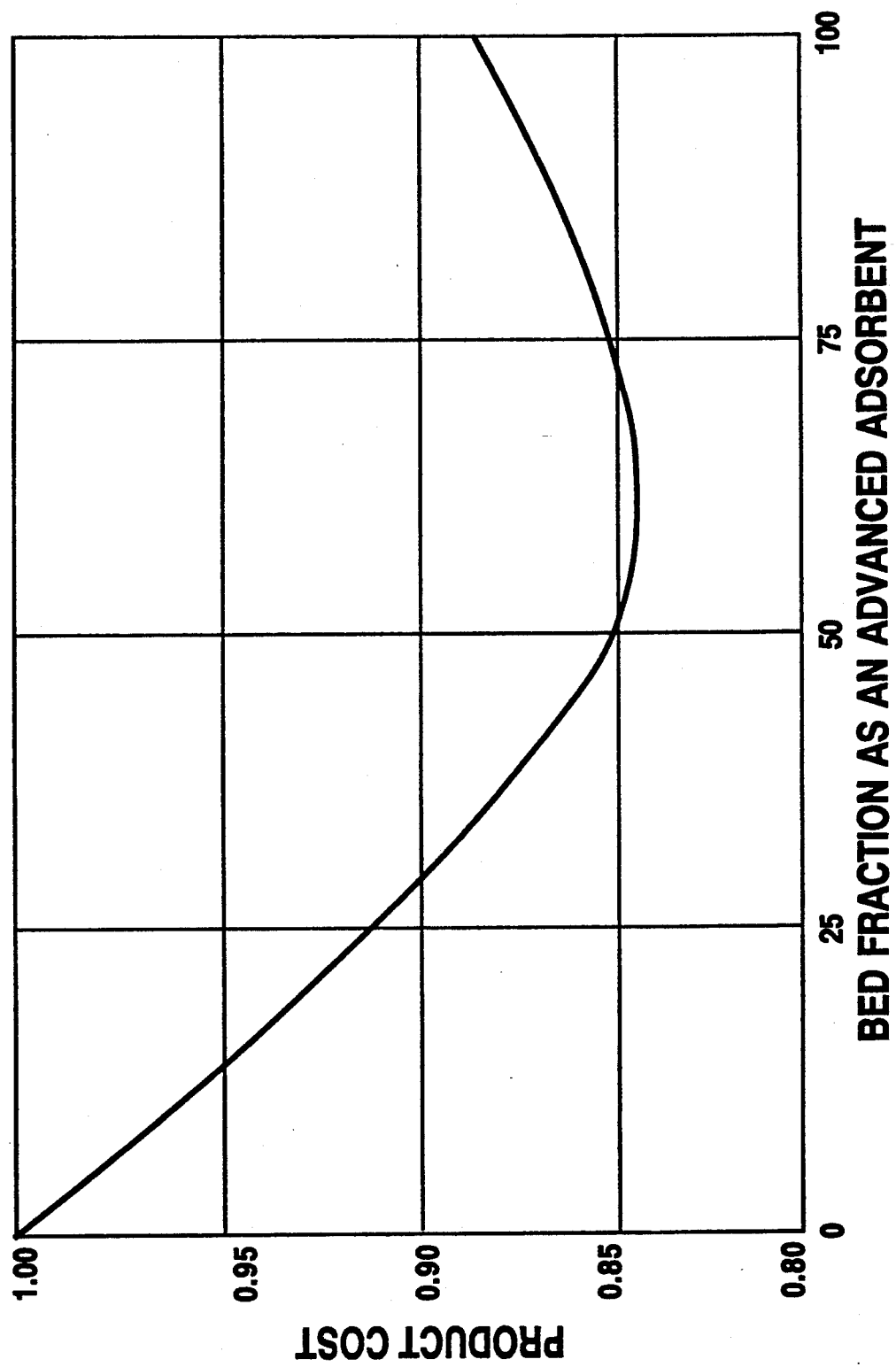

ADSORBENT BEDS FOR PRESSURE SWING ADSORPTION OPERATIONS

BACKGROUND OF THE INVENTION

1. Field of the Invention

The invention relates to pressure swing adsorption systems. More particularly, it relates to improved adsorbent beds for use in such systems for air separation operations.

2. Description of the Prior Art

Cryogenic air separation plants utilize ultra-cold temperatures to separate oxygen and nitrogen from air. Such plants typically utilize low amounts of power, but have high capital costs associated therewith. Because of such high capital costs, cryogenic air separation plants are competitive only for high flow capacity operations.

For lower capacity operations, where cryogenic air separation plants may not be economically feasible, pressure swing adsorption (PSA) systems are particularly suitable for a wide variety of important commercial applications. For example, high purity oxygen is used in various industries, such as chemical processing, steel mills, paper mills, and in lead and gas production operations. Nitrogen is also used in numerous chemical processing, refinery, metal production and other industrial applications.

In the PSA process, a feed gas mixture, such as air, containing a more readily adsorbable component and a less readily adsorbable component, e.g., the nitrogen and oxygen components of air, is passed to the feed end of an adsorbent bed capable of selectively adsorbing the more readily adsorbable component at a higher adsorption pressure. The less readily adsorbable component passes through the bed and is recovered from the discharge end of the bed. Thereafter, the bed is depressurized to a lower desorption pressure for desorption of the more readily adsorbable component, and its removal from the feed end of the bed prior to the introduction of additional quantities of the feed gas mixture for repressurization and adsorption as cyclic adsorption-desorption-repressurization operations are continued in the bed. Such PSA processing is commonly carried out in multi-bed systems, with each bed employing the PSA processing sequence on a cyclic basis interrelated to the carrying out of such processing sequence in the other beds of the adsorption system. In PSA systems for the recovery of high purity oxygen product as the less readily adsorbable component of air, each adsorbent bed will commonly contain an adsorbent material capable of selectively adsorbing nitrogen as the more readily adsorbable component, with the selectively adsorbed nitrogen being subsequently desorbed and recovered from the bed upon reduction of the pressure of the bed from the higher adsorption pressure level to a lower desorption pressure level. PSA systems for the recovery of nitrogen product have likewise been based on the use of adsorbents that selectively adsorb nitrogen from air as the more readily adsorbable component thereof.

Early PSA air separation systems utilized two and three beds, with well known molecular sieves, e.g., 13X zeolite molecular sieve material, being used as the adsorbent therein. Such zeolitic molecular sieve material, and other such materials, e.g., 5A material, capable of selectively adsorbing nitrogen from air, are equilibrium type adsorbents. Thus, an adsorption front of the selectively adsorbed nitrogen is formed at the feed end of the bed of such material, and advances toward the discharge or oxygen product end as a result of the equilibrium conditions established in the bed of zeolite molecular sieve material between the more readily adsorbable nitrogen and the less readily adsorbable oxygen components of feed air.

While conventional zeolite molecular sieves can desirably be used in PSA operations, specially modified materials can also be used for the desired selective adsorption of nitrogen from feed air, and the recovery of oxygen or nitrogen as the desired product gas. Thus, the lithium cation forms of conventional zeolite X have, more recently, been developed for use in PSA processing. Such lithium, i.e. LiX, adsorbent is found to exhibit a highly desirable capacity and selectivity toward the adsorption of nitrogen from air or other streams containing less polar or less polarizable molecular species, such as oxygen.

LiX adsorbent materials proposed for PSA processing operations are the lithium cation forms of zeolite in which the framework $Si/Al_2$ molar ratio is from about 2.0 to about 3.0, preferably from 2.0 to 2.5, and in which at least about 88%, preferably at least 90%, more preferably at least 95% of the $AlO_2$-tetrahedral units are associated with lithium cations. The nitrogen adsorption properties of such highly exchanged forms of LiX are totally unpredictable from the results obtainable using LiX materials in which 86 equivalent percent or less of the cations are lithium and the remainder are principally sodium cations.

It had been found that, when said 13X adsorbent material was combined with two-bed vacuum PSA (VPSA) systems, desirably lower power requirements and capital costs could be achieved. Such vacuum systems are typically operated with a higher adsorption pressure above atmospheric pressure, and a lower desorption pressure in the subatmospheric pressure range. The newer, specially modified adsorbent materials referred to above have been found to greatly lower the power requirements of the VPSA system. However, because of the more complex processing requirements needed to produce such specially modified adsorbent materials, the costs associated with the use of such materials, hereinafter referred to as "special adsorbent" materials, are quite high, and VPSA processing employing such special adsorbents tends to be very expensive. In typical size VPSA systems, two beds of approximately six foot lengths are filled with conventional 13X adsorbent or with special adsorbent material. While such VPSA systems, using the special adsorbent have on the order of 15% lower power costs than those using conventional 13X adsorbent, such special adsorption systems have a considerably higher, adsorbent material cost than the conventional VPSA system of the same size.

While the special adsorbent materials have desirable properties for use in VPSA systems, it will be seen that the high cost of such specially modified materials creates a deterrent to the use thereof in practical commercial VPSA systems. It would be highly desirable in the art for developments to be made leading to improved VPSA processing, particularly developments enabling such special adsorbent materials to be more fully utilized in VPSA systems without the appreciable cost disadvantage presently associated therewith.

It is an object of the invention, therefore, to provide improved VPSA systems and processes.

It is another object of the invention to provide adsorbent beds for VPSA systems capable of achieving a desirable balance of lower power requirements and reduced costs.

With these and other objects in mind, the invention is hereinafter described in detail, the novel features thereof being particularly pointed out in the appended claims.

SUMMARY OF THE INVENTION

Composite adsorbent beds are provided for VPSA air separation systems, wherein special adsorbent material is employed at the feed end of the bed and 13X adsorbent material is employed at the discharge end thereof. The air separation performance of the special adsorbent material is achieved, but at desirably lower cost than is obtainable using an all-special adsorbent PSA system.

BRIEF DESCRIPTION OF THE DRAWING

The invention is hereinafter described with reference to the accompanying single figure drawing that is a graph of product cost vs. adsorbent bed composition for various bed compositions ranging from all 13X beds to all-special adsorbent beds.

DETAILED DESCRIPTION OF THE INVENTION

The objects of the invention are accomplished by the use of composite adsorbent beds employing both conventional 13X adsorbent material and special adsorbent material. VPSA systems employing special adsorbents only have lower power consumption, but a much higher adsorbent cost than comparable 13X systems. With the use of the composite adsorbent beds of the invention, little or no penalty relative to the power requirements of the special adsorbent VPSA system is encountered, and significant savings in special adsorbent molecular sieve cost can be realized depending on the amount and configuration of each type of adsorbent material employed in the bed.

For purposes of tests leading to the discovery of the desirable balance of power and cost obtainable using the composite adsorbent beds of the invention, 2.5 LiX material was employed as the special adsorbent material, with conventional adsorbent being added to the top, or product, end thereof. Composite adsorbent beds were advantageously and surprisingly found to combine the higher performance characteristics of the special adsorbents with desirably lower costs.

The results of tests establishing the benefits of the invention are shown in the Table below, with respect to investment, power and product costs for a typical VPSA air separation system for oxygen production being shown on a normalized basis, for convenient comparative Purposes. The product cost for Particular composite bed combinations is shown in the accompanying drawing.

TABLE

| Adsorbent | VPSA Composite Beds | | |
|---|---|---|---|
| | Normalized Investment Cost | Normalized Power Cost | Normalized Product Cost |
| All Conventional Adsorbent | 1.00 | 1.00 | 1.00 |
| 25% Conventional 75% Special Adsorbent | 0.85 | 0.86 | 0.85 |
| All Special | 0.90 | 0.85 | 0.88 |

From the results of such representative testing, it has been found that starting with a bed of special adsorbent, it is highly desirable to add 13X adsorbent to the top or product end of the bed for advantageous commercial VPSA operations. Thus, it will be seen that the use of a composite adsorbent bed enables a desirable reduction in normalized product cost to be achieved over that obtainable using an all special adsorbent bed, with normalized investment cost being advantageously reduced at little or no sacrifice in normalized power cost.

In the practice of the invention in practical commercial applications, the special adsorbent bed fraction starting at the feed end of the overall adsorbent bed can range from about 25% to about 95% of the total bed, with the special adsorbent bed fraction being from about 50% to about 75% of the total bed in preferred embodiments of the inventions.

It is also within the scope of the invention to employ the composite adsorbent beds of the invention in embodiments in which a conventional adsorbent bed fraction is employed at the feed end of the bed, upstream of the special adsorbent-conventional adsorbent composite described above. In such acceptable, but not preferred, embodiments, the optional conventional bed fraction at the feed end of the bed will generally comprise from about 5% to about 30% of the overall composite, three-tier adsorbent bed. It will be understood that in the practice of such three-tier embodiments, the proportions or bed fractions of special adsorbent and conventional adsorbent employed downstream will be adjusted accordingly and in accordance with the requirements of any given application. As with the preferred special adsorbent-conventional adsorbent composites referred to above, the conventional adsorbent fraction at the downstream Product end of the bed in the three-tier optional embodiments will typically be at least about 25% of the total bed, although the proportions of the bed fraction will again vary depending on the requirements of any particular air separation application.

While the invention has been described herein with respect to particular embodiments thereof, it will be understood that various changes and modifications can be made in the details thereof without departing from the scope of the invention as recited in the appended claims. Thus, the invention can be used for air separation operations in which oxygen, the less readily adsorbable component of air, is recovered as product oxygen from the discharge end of the bed, typically at purity levels of from about 88% to about 93% or in which nitrogen, the more readily adsorbable component of the equilibrium type adsorbents used in the composite beds of the invention, can be recovered, upon desorption, as the desired product gas from the feed end of the bed. Likewise, the adsorption—desorption—repressurization processing sequence of PSA operations can be modified to include other processing steps known in the art, such as a cocurrent depressurization—pressure equalization step in which gas is discharged from the discharge end of one bed upon completion of higher pressure adsorption therein, and passed to the discharge end of another bed initially at lower pressure, e.g. the lower desorption pressure, for pressure equalization therebetween for desirable power recovery purposes. Furthermore, the invention can be practiced in PSA systems having at least one adsorbent bed, with multi-bed systems being preferred, and a two-bed system being most Preferred in the practical commercial application of the invention.

While the pressure conditions employed with the composite adsorbent bed VPSA systems of the invention can vary depending on the overall requirements of the system and operation, it should be noted that the higher adsorption pressure will be in the superatmospheric pressure range and will extend generally to about 150 psia or above. The lower desorption pressure will be in the subatmospheric pressure range and will extend down to about 3 psia or below.

While the invention has been described particularly with respect to 13X material, it is appreciated that other conventional, non-ion-exchanged zeolitic molecular sieve materials can also be employed in combination with the special adsorbents of the invention, i.e. with the lithium cation form of zeolite X, LiX.

As indicated above, the LiX adsorbent materials desirably used for the special adsorbent fraction of the adsorbent bed in the practice of the invention are the lithium cation forms of zeolite X in which the framework $Si/Al_2$ molar ratio is from about 2.0 to about 3.0, preferably from 2.0 to 2.5, and in which at least about 88%, preferably at least 90%, more preferably at least 95%, of the $AlO_2$-tetrahedral units are associated with lithium cations. It has further been discovered that an increase in the relative proportion of $AlO_2$-tetrahedral units in the zeolite X framework from 44.4% of the total tetrahedral units to 50% of said total units, with a corresponding increase in $Li+$ ions, i.e. the same equivalent percent of $Li+$ ions in each case, also serves to increase the adsorption capacity and selectivity of the zeolite for nitrogen, which is far greater than that related simply to the indicated increase in the number of cations in the LiX material.

In the preparation of the LiX materials for use in the practice of the invention, conventionally available zeolite X starting materials can readily be employed. Two such materials are zeolite X having $SiO_2/Al_2O_3$ ratios of 2.5 and 2.0, having principally sodium cations, i.e. NaX material. The 2.5 NaX material can be synthesized hydrothermally at a temperature of about 100° C. using sodium silicate and sodium aluminate and water as the reagents in accordance with the teachings of the Milton patent, U.S. Pat. No. 2,882,244, the reaction mixture having the following composition in terms of molar oxide ratios:

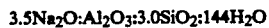

$$3.5Na_2O:Al_2O_3:3.0SiO_2:144H_2O$$

The 2.0 NaX material can be synthesized in the mixed sodium-potassium form, as by first dissolving 208 grams of $Al(OH)_3$ in 267 grams of an aqueous 50% NaOH solution, using heating and stirring to form a first solution, i.e., solution (a). Solution (b) is prepared by dissolving 287 grams of 85.3% KOH pellets in 1,000 grams of water and then mixing the solution thus formed with 671 grams of an aqueous 50% NaOH solution. Solution (a) is slowly added to solution (b) to form solution (c), which is cooled to 4°–12° C. Solution (d) is prepared by diluting 453.25 grams of 40-grade sodium silicate (9.6% $Na_2O$; 30.9% $SiO_2$) with 1,131.7 grams of water. The cooled solution (c) is added to solution (d) in a blender and mixed at low speed for 3 minutes. The cooling and the avoiding of the creation of an undue amount of mechanical energy in the final mixing are important factors in the preparation of a high quality product. Gelling should not occur until after about 4 minutes. The gel is aged at 36° C. for 2–3 days and digested at 70° C. for 16 hours. The desired zeolite is then isolated by filtration, and the filter cake is rinsed with aqueous NaOH solution (PH of 12) in an amount equal to seven times the volume of the mother liquor. The rinsed product is reslurried in 4 liters of NaOH solution (pH of 10) and is then recovered by filtration and rinsed with water. The reslurry procedure is desirably repeated two more times, and the isolated product is dried in air. The dried product is slurried in 100 ml of 1% NaOH solution and is maintained in the slurry at 90° C. for 21 hours. After filtration, the cake is reslurried with 1,000 ml of NaOH solution (pH of 12) at 60° C. for 30 minutes and filtered. The reslurry process is desirably repeated twice more, and then the solids are recovered by filtration and washed with aqueous NaOH solution (pH of 9) and dried in air.

Using the 2.5 NaX as prepared above, a zeolite "preform" agglomerate can be produced by first washing the starting zeolite crystals with an aqueous caustic solution having a pH of 12 and consisting essentially of sodium hydroxide and water, and then washing with water to a PH of 9. The washed zeolite crystals are then admixed with Avery clay, a commercially available kaolin type clay, in the proportions of 80 weight % zeolite and 20 weight % clay. The zeolite clay mixture is then combined with sufficient water to produce an extrudable mass with sufficient green strength to enable the extruded pellets to undergo the subsequent firing step in which the kaolinitic clay is converted to an active meta-kaolin form at a temperature of about 650° C. for about 1 hour. After firing, the bonded agglomerates are cooled and immersed and digested in an aqueous caustic solution at about 100° C. to convert the bulk of the meta-kaolin to zeolite crystals, mainly zeolite X crystals. The digested agglomerates are removed from the caustic digestion solution, again washed with a fresh aqueous NaOH solution having a pH of 12 and finally washed with water to a PH of 9–10 and dried in air. The dried product pellets are broken and sieved to form particles having a convenient size, such as 16×40 mesh.

Such mesh particles can be activated by heating in a vacuum at a temperature of 375° C. for a period of about 2.5 hours. This activation is carried out carefully in this manner so that the zeolite NaX crystals are not subjected to undue hydrothermal abuse by the steam formed from occluded and/or adsorbed water. The activated material thus formed is a 2.5 NaX activated material.

In the preparation of LiX material, unactivated mesh particles may be subjected to an ion-exchange procedure whereby the particles are contacted in a glass column by a stream of a 1.0 molar aqueous lithium chloride, adjusted to a PH of 9.0 using LiOH, at a temperature of 80° C. A quantity of lithium chloride solution is employed such that the zeolite particles are desirably contacted with a four-fold stoichiometric excess of lithium ions over a period of about 14 hours. The ion-exchange solution leaving the column is not recycled. The resulting ion-exchanged product is washed with water, and is adjusted to a pH of 9 using LiOH, and is found to be 94% ion-exchanged.

Using the low silica 2.0 NaKX material prepared as described above, the alkali metal cations can be replaced by lithium cations to the extent of greater than 99 equivalent percent, if desired, by ion-exchange with an aqueous lithium chloride solution (pH of 9, adjusted with LiOH). This material, in powdered form, comprises 2.0 LiX (99%) material.

Those skilled in the art will appreciate that various changes and modifications can be made in the details of the LiX preparation procedures, which do not form a Part of the present invention. With this understanding, it should be noted that, for example, a 2.5 NaX material can be ion-exchanged using the volume technique described above with an aqueous lithium chloride solution (pH of 9, adjusted with LiOH) using either less or greater than the four-fold amount of LiCl so that products having various amounts of lithium cations are formed. It will also be appreciated that desirable LiX material can be prepared by such ion-exchange using lithium carbonate or other such lithium salt in place of lithium carbonate.

The invention will be seen to provide a desirable advance in the PSA art. By enabling the product costs associated with VPSA operations to be appreciably reduced without the cost penalty commonly associated with the use of special adsorbents, the invention enables VPSA operations to be carried out more efficiently in satisfying the ever increasing need for oxygen and nitrogen in a wide variety of practical commercial operations.

I claim:

1. In a vacuum pressure swing adsorption system for the recovery of oxygen or nitrogen from air, said system being adapted to operate between a superatmospheric or atmospheric higher adsorption pressure and a subatmospheric lower desorption pressure on a cycle basis, said system containing one or more adsorbent bed, each bed being capable of selectively adsorbing nitrogen as the more readily adsorbable component of feed air, the improvement comprising incorporating, as each said adsorbent bed, a composite bed comprising special adsorbent material at the feed end of the bed and conventional non-ion-exchanged zeolite X adsorbent material at the opposite, product end thereof, said special adsorbent material extending from said feed end comprising from about 25% to about 95% of the overall adsorbent bed, said special adsorbent material comprising the lithium cation form of zeolite X in which the Si/Al$_2$ molar ratio is from about 2.0 to about 3.0 and in which at least about 88% of the AlO$_2$-tetrahedral units are associated with lithium cations, whereby the product costs are desirably reduced, without any appreciable increase in power requirements, compared to an all-special adsorbent system.

2. The system of claim 1 in which the bed fraction of special adsorbent material is about 50% to about 75% of the total bed.

3. The system of claim 1 in which said conventional adsorbent material comprises 13X.

4. The system of claim 3 in which said special adsorbent material has at least 90% of the AlO$_2$-tetrahedral units associated with lithium cations.

5. The system of claim 4 in which at least 95% of the AlO$_2$-tetrahedral units are associated with lithium cations.

6. The system of claim 5 in which the special adsorbent material at the feed end of the bed comprises about 50% to about 75% of the total bed.

7. The system of claim 6 in which said system comprises two adsorbent beds.

8. The system of claim 3 in which said system comprises two adsorbent beds.

9. The system of claim 1 in which the system is adapted to produce oxygen product.

10. The system of claim 9 in which the system is adapted to produce oxygen product having a purity of from about 88% to about 93%.

11. The system of claim 1 in which said system is adapted to produce nitrogen product.

12. The system of claim 1 and including a conventional non-ion-exchanged zeolite X adsorbent material at the feed end of the bed upstream of said composite bed of special adsorbent material and conventional adsorbent material, said special adsorbent material forming an intermediate portion of said bed between the conventional adsorbent material at each end thereof.

13. The system of claim 12 in which the conventional adsorbent at the feed end of the bed has a bed fraction of from about 5% to about 30% of the total bed.

14. The system of claim 13 in which said conventional adsorbent comprises 13X.

15. The system of claim 14 in which at least about 95% of the AlO$_1$-tetrahedral units are associated with lithium cations.

16. The system of claim 12 in which said conventional adsorbent comprises 13X.

17. The system of claim 12 in which said system comprises two adsorbent beds.

18. The system of claim 1 in which said system comprises two adsorbent beds.

* * * * *